United States Patent [19]
Miller

[11] 3,756,535
[45] Sept. 4, 1973

[54] ANTI-FRICTION DISK FOR STRIP MATERIAL CARTRIDGE

[75] Inventor: Stephen H. Miller, Rochester, N.Y.

[73] Assignee: Eastman Kodak Company, Rochester, N.Y.

[22] Filed: Nov. 17, 1971

[21] Appl. No.: 199,681

[52] U.S. Cl. .............................. 242/197, 242/71.8 A
[51] Int. Cl. .... B65h 75/18, G03b 1/04, G11b 15/32
[58] Field of Search ................. 242/55.19 A, 55.21, 242/71.8, 71.8 A, 118.31, 197-200; 352/72, 78

[56] References Cited
UNITED STATES PATENTS 3,208,685  9/1965  Edwards et al. ..................... 242/194
912,564    2/1909  Hastings ........................ 242/118.31

*Primary Examiner*—Leonard D. Christian
*Attorney*—W. H. J. Kline et al.

[57] ABSTRACT

An anti-friction disk for a motion picture film cartridge includes an elongated, cylindrical central hub portion with a metal ring at the outer edge. The metal ring adds rigidity to the cylindrical hub portion so that the hub serves more effectively to keep a film roll in a generally round configuration, thereby avoiding crushing of the film supply or cinching of the film roll on the supply post.

5 Claims, 2 Drawing Figures

PATENTED SEP 4 1973

3,756,535

STEPHEN H. MILLER
INVENTOR.

BY D. Herman Childers

W. H. J. Kline

ATTORNEYS

3,756,535

ANTI-FRICTION DISK FOR STRIP MATERIAL CARTRIDGE

BACKGROUND OF THE INVENTION

1. Field of the Invention

The present invention relates to a motion picture film cartridge and, more particularly, to a motion picture film cartridge of the type having a coreless film supply.

2. Description of the Prior Art

Motion picture cartridges adapted to be inserted into cinematographic apparatus are well known in the art. A cartridge of a type commonly available for use in a camera is disclosed in commonly assigned U.S. Pat. No. 3,208,685 issued Sept. 28, 1965, to Edwards et al. In such a cartridge, film in a coreless coil or roll is positioned in the supply chamber of the cartridge and is freely rotatable about the supply post or central hub located therein. During operation of the cartridge in a camera, the film moves along a predetermined path through the cartridge, the path leading from the supply chamber, past an exposure aperture and into a film take-up chamber. Movement of film in the cartridge in any manner other than along the desired, predetermined path can be detrimental to the operation of the cartridge.

Films having a relatively thin base or overall web thickness have been developed in recent years. Attempts t0 use such thinner and highly flexible films in film cartridges have resulted in problems with film movement not anticipated by the prior art. When the thinner and more flexible films are wound into a coreless coil or roll and placed in a cartridge such as disclosed in the before-mentioned patent to Edwards et al, the convolutions of the film tend to collapse. Also, impact forces tend to cause distortion of the roll of film and cause the roll to collapse radially inwardly and bulge radially outwardly so that it assumes a generally elliptical shape. Such movement or collapsing of film can result in the film cinching upon the supply post in the supply chamber or result in passage of the film into open areas of the cartridge. If the film were allowed to freely collapse or otherwise move about the cartridge in such a manner, excessive frictional forces could result, thereby causing unsteady film registration in the exposure aperture or otherwise causing erratic operation of the cartridge or camera which receives the cartridge.

Many features typically used in a film cartridge serve to effectively control most of the movement of thin base film in the cartridge. However, those features do not adequately prevent the collapse of the inner convolutions of the supply roll and the related problems caused thereby. A brief explanation of the alternatives which have previously been used for controlling the inner convolutions of the supply roll will illustrate the ineffectiveness of the prior art for controlling thinner and more flexible films.

A first alternative for controlling the inner convolution of the supply roll was suggested by the aforementioned commonly assigned Edwards et al patent. The Edwards et al patent generally disclosed an anti-friction disk which serves to confine the outer convolutions of a supply roll to a fixed diameter so those convolutions do not "clockspring," i.e., displace radially outwardly, into contact with the walls of the supply chamber. Also, the Edwards et al. patent discloses a lip extending from the inner portion of the anit-friction disk to prevent the inner convolutions from collapsing or otherwise contacting the supply post in the supply chamber. Though adequate for preventing the inner convolutions of a roll of thicker base film from being displaced, experience has indicated that thin base films can collapse over such a lip and contact the supply post. Additionally, the inner lip as disclosed by the Edwards et al patent was supported by the supply post about which the disk rotated. In at least one cartridge now commercially available from the assignee of the present invention, the supply post in the cartridge includes a cut-away portion in the area where the post normally would support the lip. A cartridge of this construction is disclosed in commonly assigned copending U.S. Pat. application Ser. No. 24,077, entitled "Integral Anti-Backup Mechanism in a Motion Picture Film Cartridge," filed Mar. 31, 1970, in the name of Sutliff et al. Without support being given by the supply post to any portion of the lip existing in the area of the cut-away, the film can deflect the lip upon impact, thereby allowing the film to pass over the lip and collapse around the supply post. Any film passing over the lip in this manner would then be free to pass into the open cut-away area of the supply post and become compacted therein.

The aforementioned Edwards et al patent also suggests controlling of the inner convolution of a supply roll by inserting a pre-shaped tongue on the inner end of the supply roll into a hole in the film spaced therefrom to form a loop of film slightly larger in diameter than the post. Such a loop is effective when used with thicker base films to prevent the inner convolution from decreasing in diameter beyond a minimum dimension and thereby cinching upon the supply post. With conventional, relatively thick base films, the loop aids in preventing the inner convolutions of the roll from collapsing. On the other hand, with thinner films, such a loop does not adequately prevent the film roll from collapsing and cinching on the post. This is because thin base films are so limp that, when formed in a loop of the nature described, the loop will not support the outer convolutions wound upon it and any coil thus wound is readily deformed by impact forces. In addition, the formation of the loop adds expense to equipment designed to spool film into rolls. Thus it is desirable that any improvement directed at preventing the inner convolutions from collapsing also should provide for the elimination of such a loop.

A third alternative, also suggested by the Edwards et al patent, is that the supply post or base could include a freely rotatable member upon which the innermost convolutions of film may cinch. While this alternative is a viable one for supporting thin base films, the additional costs for manufacturing and inserting such members in the assembled cartridges and the additional inventory required for such members reduces the desirability of using this alternative.

It is apparent that an improved, less costly alternative is desired for use in cartridges to prevent thinner and more flexible films from collapsing in the cartridge or otherwise passing into open areas of the cartridge. The subject invention provides such an alternative for achieving that objective with a resulting reduction in manufacturing inventory and costs.

SUMMARY OF THE INVENTION

An object of this invention is to provide a film cartridge for cinematographic apparatus which will permit even very flexible films to be readily withdrawn from the supply chamber.

Another object of this invention is to provide an improved anit-friction means for minimizing the forces opposing the unwinding of a very thin, highly flexible strip from a supply roll.

Another object of this invention is to provide a film cartridge for cinematographic apparatus with means for preventing the inner convolution of a supply roll of film from collapsing inwardly and cinching on part of the cartridge, even if the cartridge is subjected to impact forces.

A further object is to eliminate certain manufacturing operations and their costs, such as shaping of the inner end of the film into a tongue and insertion of the tongue into a hole to form a loop of film.

Still another object of this invention is to provide a film cartridge for cinematographic apparatus which prevents inward collapsing or cinching of even highly flexible film rolls and also prevents the outer convolutions of the rolls of film from clockspringing into contact with the peripheral walls of the supply chamber.

According to a preferred embodiment of the invention, a rotatable means is provided for a film cartridge to reduce the forces opposing the movement of film from the supply roll within the cartridge, the rotatable means further comprising a hub portion having a reinforcing rim to prevent collapsing of hub when impacted by the roll of film.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Because photographic apparatus are well known, the present description will be directed in particuar to elements forming part of, or cooperating more directly with, the present invention, elements that are not specifically shown or described herein being understood to be selectable from those known in the art.

Briefly, the present invention relates to a cartridge with an anti-friction disk of the type generally disclosed in U.S. Pat. No. 3,208,685 to Edwards et al. The cartridge disk of this invention has a central hub portion that serves to retain the innermost convolutions of a supply roll of film at a minimum diameter, thereby preventing the film from collapsing around the stationary supply post or boss about which the roll of film rotates and also preventing the film from otherwise unnecessarily contacting other internal surfaces of the cartridge.

As previously indicated, the present invention relates to certain modifications and improvements to film cartridge disks of the type disclosed in the aforementioned Edwards et al patent. Accordingly, the complete disclosures in that patent are incorporated herein by reference. In the following disclosure, numerals less than 100 are used to identify the same or similar parts disclosed in the Edwards et al patent and the numerals greater than 100 are used to identify features not disclosed therein.

Figure 2:
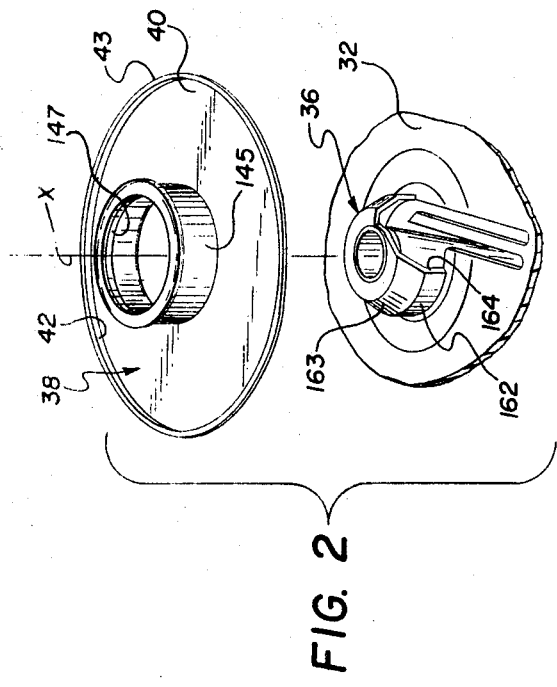
FIG. 2 is an exploded perspective view of portions of a film cartridge showing a stationary supply post and an anti-friction disk constructed in accordance with the preferred embodiment of the invention.
Figure 1:
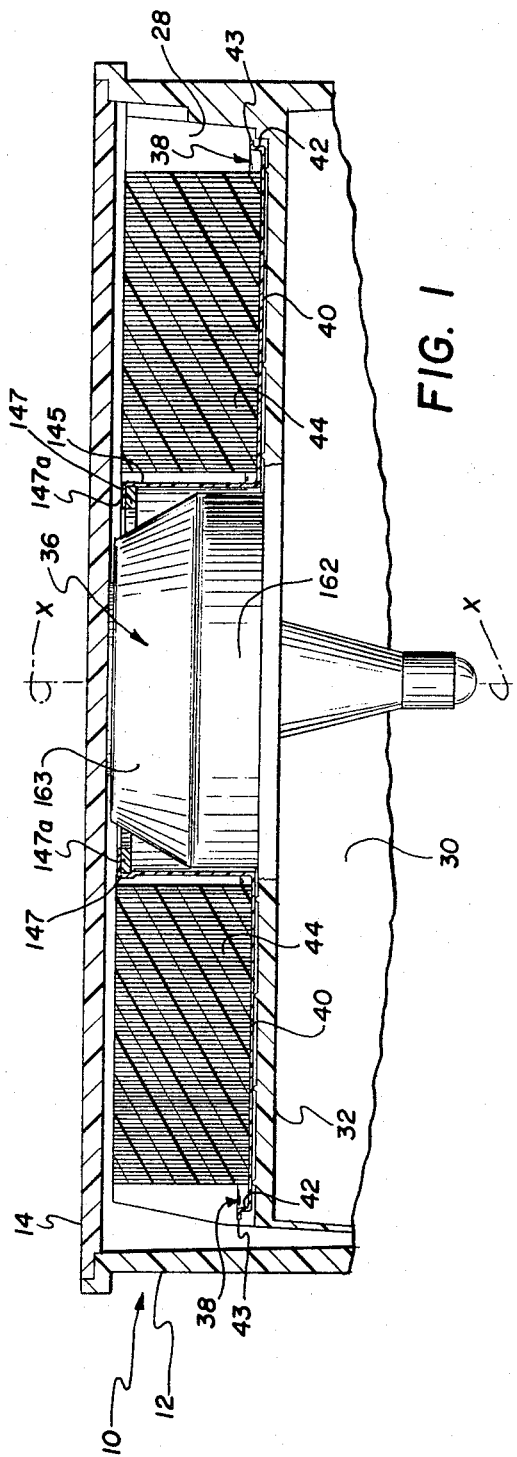
FIG. 1 is a sectional view through a film cartridge according to a preferred embodiment of the present invention and showing the film supply side of the cartridge with certain parts broken away to better show the invention.

Referring now to the drawings, FIG. 1 shows a film cartridge generally designated 10 comprising a body 12 and a cover 14. Body 12 includes a cylindrical film supply chamber 28 and a cylindrical take-up chamber partially shown at 30 separated by a wall 32. The chambers are at opposite sides of the body substantially in coaxially alignment with each other. A stationary locating boss or post 36 is formed integral with wall 32 substantially at its center and projects into supply chamber 28. Boss 36 has a generally cylindrical bearing surface portion 162 projecting from wall 32 and a frusto-conical end portion 163 which tapers radially inwardly from portion 162 toward cover 14. An opening 164 in the boss extends through portions 162 and 163 as disclosed in the before-mentioned U.S. Pat. application Ser. No. 24,077. Boss 36 and the supply and take-up chamber all have a common axis X.

In accordance with the present invention, a flexible, substantially annular, anti-friction disk 38 is provided. Disk 38 comprises a flat tray portion 40, a lip 42 extending substantially perpendicular to the plane of and around the outer circumference of tray portion 40, and an outwardly turned rim 43. The inner periphery of disk 38 comprises an integral, substantially cylindrical hub portion 145 and a rim portion 147. The hub portion 145 is substantially perpendicular to tray portion 40 and projects from the same side of the tray portion as lip 42. Hub portion 145 projects from the tray portion by a distance substantially equal to, and preferably only slightly less than, the width of the film roll 44 to be placed in the supply chamber. Rim 147 projects radially inwardly from the end of the cylindrical hub portion 145 opposite from tray 40. The inner diameter of the rim is smaller than the diameter of bearing surface 162 of the boss but is larger than the portion 163 of the boss that is located between the rim and axis X.

Disk 38 is coaxially positioned over boss 36 for rotation thereabout in a plane substantially perpendicular to the axis X of boss 36. Disk 38 is supported in this position by bearing surface 162 on boss 36 which is slidably contacted by the portion of hub 145 nearest the tray portion 40. As is apparent from FIG. 1, this leaves the rim portion 147 and the part of the hub 145 remote from the tray portion 40 unsupported by bearing surface 162. Because rim 147 is not supported by boss 36, and in view of the tendency of rolls of relatively thin, highly flexible films to collapse or cinch around the boss 36, rim 147 is substantially rigid so that it supports the film roll.

The rim 147 can be made rigid by suitable reinforcing means, and in the preferred embodiment illustrated the reinforcing means comprises a metal ring 147a approximately 0.015 inches thick. The ring 147a can be vacuum formed into the anti-friction disk so that it is, in effect, an integral part thereof. Alternatively the disk 38 and ring 147a can be separately formed and assembled by pressing the ring into a seat in the cylindrical hub 145. Rim 147 is sufficiently rigid to support coreless film supply 44 and prevent the inner convolutions from deflecting or collapsing the hub 145 upon impact. This also prevents the film from passing over or from cinching upon boss 36 and from collapsing into opening 164. It should be noted that disk 38 is purposefully very thin and quite flexible except in the area of rim 147, and that the rim 147 together with the portion of the hub 145 positioned over surface 162 provides good firm support for the film roll throughout its width.

A coreless roll or coil 44 of film is placed in supply chamber 28 coaxial with boss 36 such that one spirally wound edge of the film is positioned against the flat tray portion 40 of disk 38, and its other spirally wound edge lies in a plane substantially parallel to and closely adjacent to the inner wall of cover 14. By means of this positioning, the spirally wound convolutions of the coil are prevented from being displaced axially of the roll relative to one another by an amount which might cause jamming of the filmstrip within the supply chamber 28. Lip 42 of disk 38 will overhang the marginal portion of the radially outer convolution of the coiled film 44 and normally prevent the outermost flat surface thereof from excessively engaging the peripheral wall of supply chamber 28 during rotation of the film roll. Similarly hub 145 will prevent the innermost convolutions of roll 44 from crushing, collapsing, passing into opening 164 of the cartridge, or cinching around boss 36, any of which would restrict free rotation of the coreless roll of film as the film is withdrawn from supply chamber 28.

The anit-friction disk 38, as disclosed, substantially confines the film roll 44 and isolates it from direct engagement with all the stationary parts of the supply chamber except the cover. The outer convolution of the film is restrained from clockspringing by lip 42 and hub 145 prevents radially inward displacement of the inner convolution of film. Thus the anti-friction disk prevents the film from being displaced in an undesirable manner and thereby subjected to a frictional drag which would impede the film claw from readily pulling film from the supply roll.

While the invention has been particularly described with reference to the film cartridge, the invention also is applicable to other flexible strip handling cartridges, such as a tape supply for recorder and/or playback device, wherein a web is moved from the supply chamber to a take-up means.

The invention has been described in detail with particular reference to a preferred embodiment thereof, but it will be understood that variations and modifications can be effected within the spirit and scope of the invention.

I claim:

1. In a cartridge having means defining a supply chamber, the chamber defining means comprising first and second spaced walls, a stationary boss projecting from said first wall toward said second wall, the outer surface of said stationary boss having a substantially cylindrical portion near said first wall and a frusto-conical portion near said second wall with the smaller portion of said frusto-conical portion being adjacent said second wall, said cylindrical and frusto-conical portions having an opening extending along a portion of said stationary boss, said chamber defining means further comprising a rotatable member positionable in the chamber and having disk and hub portions for receiving a supply coil of highly flexible strip material that can collapse radially inwardly, said rotatable member and said coil being disposed substantially coaxially with said stationary boss and being rotatable thereabout, said disk portion of said rotatable member positioned adjacent to said first wall and being between said first and second walls, and said hub portion of said rotatable member projecting from the disk portion substantially to said second wall and adapted to be received inside the inner convolution of said supply roll, the improvement comprising:

a separate reinforcing ring secured to said hub portion adjacent said second wall and bridging said opening for supporting said coil and avoiding collapsing or cinching of said coil onto said stationary boss and into the area of the opening in said stationary boss, said ring extending radially inward from said hub portion toward said frusto-conical portion of said stationary boss, the inner diameter of the ring being smaller than the diameter of said clyindrical portion of said stationary boss but larger in diameter than said frusto-conical portion of said stationary boss that is located radially inwardly of the ring.

2. In a cartridge for receiving a supply coil of highly flexible strip material, the combination comprising:

first and second spaced walls partially defining a supply chamber;

a stationary boss projecting from said first wall toward said second wall, said stationary boss having a substantially cylindrical portion near said first wall and a frusto-conical portion near said second wall, said cylindrical and frusto-conical portions having an opening extending along a portion of said stationary boss such that when said supply coil is received in said supply chamber the coil tends to collapse or cinch in the area of the opening;

rotatable means positioned in said supply chamber, said rotatable means comprising disk and hub portions for receiving said supply coil, said disk portion being disposed adjacent to said first wall substantially coaxially with said stationary boss and rotatable thereabout, said hub portion projecting from said disk portion substantially to said second wall and adapted to be received inside the inner convolution of said supply roll whereby the inner convolutions of said coil are restrained from collapsing radially inward onto said stationary boss; and a substantially rigid rim projecting inwardly from said hub portion to avoid radially inward displacement of said supply coil.

3. In a cartridge as set forth in claim 2 wherein said rim comprises a separate reinforcing member attached to said hub portion remote from the disk portion, thereby enhancing the resistance of the hub portion to being crushed by impact forces.

4. In a cartridge as set forth in claim 3 wherein said reinforcing member comprises a circular member secured to said hub portion.

5. In a cartridge as set forth in claim 4 wherein the inner diameter of said circular member is smaller than the diameter of said cylindrical portion of said stationary boss but larger in diameter than said frusto-conical portion of said stationary boss that is located radially inwardly of said circular member.

* * * * *